US00RE45491E

(19) United States
(12) Reissued Patent
Freeman

(10) Patent Number: US RE45,491 E
(45) Date of Reissued Patent: Apr. 28, 2015

(54) SPROCKET HUB MOUNTED GUARD

(71) Applicant: Ernie Freeman, Rocky River, OH (US)

(72) Inventor: Ernie Freeman, Rocky River, OH (US)

(21) Appl. No.: 13/889,685

(22) Filed: May 8, 2013

Related U.S. Patent Documents

Reissue of:
(64) Patent No.: 7,946,661
Issued: May 24, 2011
Appl. No.: 12/411,430
Filed: Mar. 26, 2009

(51) Int. Cl.
*B62D 25/16* (2006.01)
*B62D 55/088* (2006.01)

(52) U.S. Cl.
CPC ..... *B62D 55/0882* (2013.01)

(58) Field of Classification Search
CPC ..... B62D 55/088; B62D 55/0882; B62D 55/0845; B60S 1/68
USPC ..... 305/100, 107, 109–110, 136–137, 199; 404/129; 172/508
See application file for complete search history.

(56) References Cited

U.S. PATENT DOCUMENTS

| | | | | |
|---|---|---|---|---|
| 1,812,543 | A | 6/1931 | White | |
| 2,146,882 | A | 2/1939 | Baker et al. | |
| 2,518,481 | A | 8/1950 | Maguire | |
| 3,843,214 | A * | 10/1974 | Piepho | 305/119 |
| 3,861,762 | A | 1/1975 | Freedy et al. | |
| 3,912,336 | A | 10/1975 | Ritter, Jr. et al. | |
| 3,913,985 | A | 10/1975 | Orr et al. | |
| 4,104,930 | A | 8/1978 | Sanders | |
| 4,239,297 | A | 12/1980 | Livesay | |
| 4,379,565 | A * | 4/1983 | Riddle | 280/160 |
| 4,640,559 | A | 2/1987 | Crotti | |
| 5,676,493 | A | 10/1997 | Brockway | |
| 5,713,644 | A | 2/1998 | Freeman | |
| 5,733,020 | A | 3/1998 | McCartney et al. | |

(Continued)

FOREIGN PATENT DOCUMENTS

| | | | |
|---|---|---|---|
| JP | 61-165885 | U | 10/1986 |
| JP | 06-051082 | U | 7/1994 |
| JP | 2008-201356 | A | 9/2008 |

OTHER PUBLICATIONS

"1050C Crawler Dozer Final Drive Seal Guards", 3 page brochure, undated, published by John Deere.

*Primary Examiner* — Jason Bellinger
(74) *Attorney, Agent, or Firm* — Pearne & Gordon LLP

(57) ABSTRACT

A guard for a crawler type land vehicles having a frame, a final drive on each side of the frame, the final drive including a spindle housing with a flange bolted to the frame and a sprocket hub rotationally supported on the spindle housing, a track sprocket on the sprocket hub, the spindle housing and hub establishing a small gap to form a mechanical shield to protect a rotational seal within the space enclosed by the spindle housing and sprocket hub, the guard being adapted to be assembled radially outward of the mechanical shield, the guard having a circular shell member for bolting to an inside face of the sprocket hub and extending axially in one piece across substantially all of the distance between the spindle flange and the sprocket hub, the guard shell having an internal circumferential groove, a circular radial flange for mounting in the space between the spindle flange and the sprocket hub, the guard shell being diametrally split whereby it can be radially assembled around the spindle flange with the radial flange closely fitting within the groove to form a stepped gap for excluding debris including strand material from a zone within the guard shell.

21 Claims, 3 Drawing Sheets

(56) References Cited

U.S. PATENT DOCUMENTS

| | | | | |
|---|---|---|---|---|
| 5,820,230 | A | 10/1998 | Freeman | |
| 5,951,123 | A | 9/1999 | Bomstad et al. | |
| 5,967,242 | A | 10/1999 | Caron et al. | |
| 6,019,443 | A * | 2/2000 | Freeman | 305/110 |
| 6,076,843 | A | 6/2000 | Sewell | |
| 6,231,136 | B1 | 5/2001 | Freeman | |
| 6,293,631 | B1 | 9/2001 | Freeman | |
| 6,322,170 | B1 * | 11/2001 | Knell et al. | 305/107 |
| 6,371,578 | B1 | 4/2002 | Ferguson | |
| 6,880,901 | B2 * | 4/2005 | Tamaru | 305/109 |
| 7,556,323 | B1 * | 7/2009 | Gachhadar et al. | 305/107 |
| 7,946,661 | B1 | 5/2011 | Freeman | |
| 7,980,639 | B2 | 7/2011 | Matthys | |
| 2002/0140287 | A1 | 10/2002 | Fee et al. | |
| 2002/0153773 | A1 * | 10/2002 | Yoon | 305/136 |

* cited by examiner

SPROCKET HUB MOUNTED GUARD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The invention relates to improvements for land vehicles such as off-road equipment and, in particular, to guards for the final drive of track-type tractors.

PRIOR ART

Track-type tractors frequently operate in adverse conditions in land clearing and/or grading operations and the more hostile environments of landfills that accept residential and commercial refuse. Landfill sites present severe service conditions for machinery due to the mix of debris typically found on such sites. Material over which a machine runs tends to be drawn up and around rotary parts eventually leading to excessive wear through abrasion. Often times catastrophic failure occurs because of destruction of lubricant retaining seals between parts rotating relative to one another. A need, therefore, exists for a device that can protect drive areas of equipment of the type described in landfills, construction sites, and other off-road situations where the environment is adverse.

More specifically, drive sprockets for track chain, for instance, rotate relative to their support housings and normally have associated seals to protect bearings and gears within the housings that drive the sprocket hubs for rotation. The housings are subject to high wear rates through abrasion by debris entwined on the rotating parts or packed around the rotating parts. This debris eventually can wear through the walls of a housing causing catastrophic failure of bearings, gears, and/related parts.

Where a seal on a final drive of a crawler is damaged prematurely by intrusion of debris, the cost to repair the same may range, by way of example, between $4,000-6,000. Wear on a final drive housing or sprocket hub can cost as much as $7,000-8,000 in repair and a loss of oil from a damaged seal can result in repair work for internal damage of from as much as between $30,000 and $50,000.

My U.S. Pat. Nos. 6,231,136 and 6,293,631 disclose guards that have proven successful in reducing premature wear and/or failure in certain large machines manufactured by Caterpillar, Inc., sometimes identified as "high-drive" models. There remains a need for a protective guard suitable for use with other types of track machine models, particularly with models where the available space between the sprocket hub and the spindle supporting it is confined and relatively narrow.

SUMMARY OF THE INVENTION

The invention provides a guard for the final drive of a track-mounted machine that improves the protection for rotational seals of these drives to greatly reduce the risk that these seals will be destroyed with a consequent loss of lubricant and potential catastrophic destruction of the associated gear train. The disclosed guard, besides protecting the lubricant retaining seals, reduces wear on the spindle and hub to thereby greatly extend their service life.

In the preferred embodiment, the guard has an outer shell replaceably mounted on the sprocket hub so that it turns in unison with the sprocket and track. Without relative movement between the sprocket and guard shell, there is essentially no abrasion developed between these components and there is a reduced risk that stranded material such as wire, rope, or cable will be wrapped around these elements.

The rotating shell of the guard cooperates with a stationary part of the guard to make a close fitting mechanical shield in the form of a low clearance gap. The gap is advantageously located remotely from a mechanical shield provided by the original equipment formed at a gap or interface between the spindle and sprocket hub. The disclosed geometry reduces the possibility that stranded material can pass from the gap of the guard into the spindle/hub gap. Still further, the gap formed by the guard is labyrinth-like in that a straight line path through the gap is avoided. This feature is accomplished by arranging the guard shell to be installed between the sprocket and hub in sections radially over the stationary member of the guard.

DESCRIPTION OF THE PREFERRED EMBODIMENT

Figure 1:
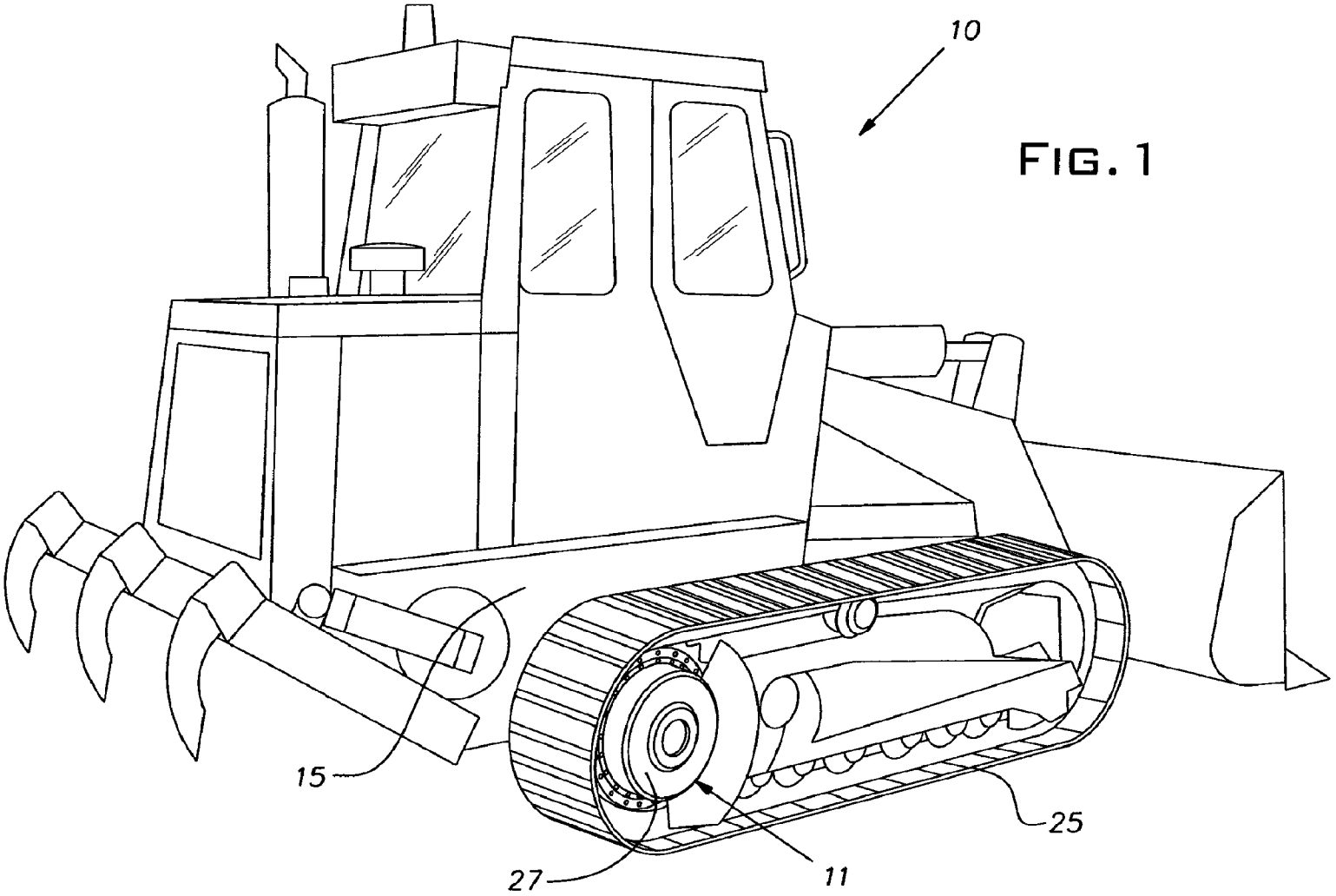
FIG. 1 is a somewhat schematic right side and rear perspective view of a track-mounted machine or tractor employing the invention.
Figure 2:
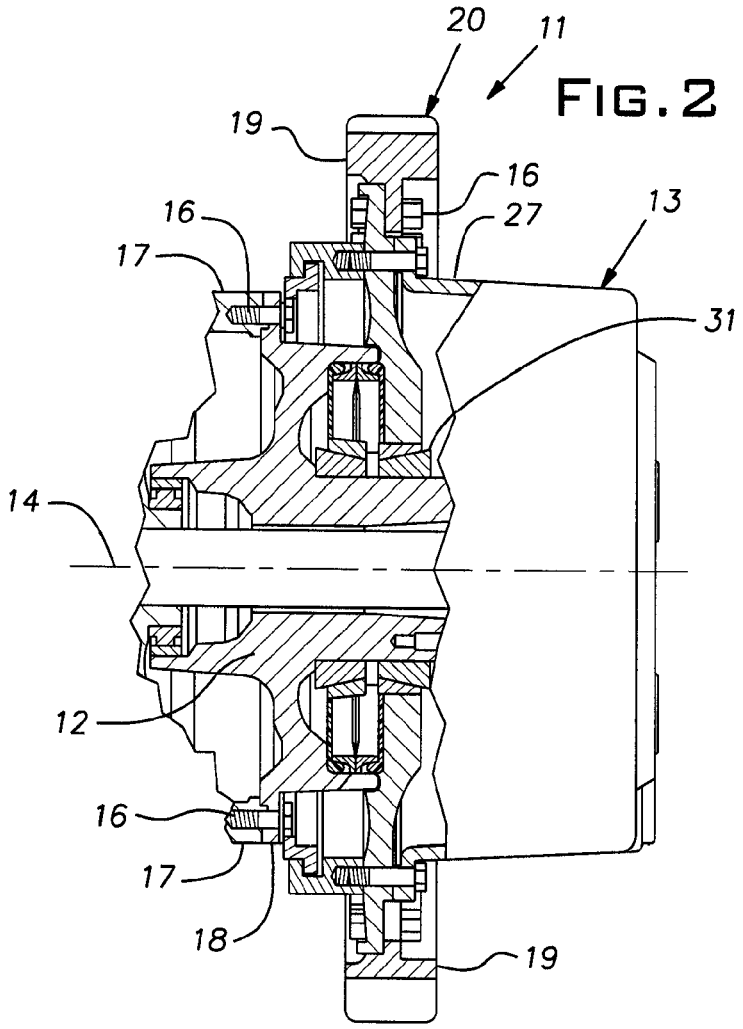
FIG. 2 is a cross-sectional view of the guard of the invention taken in a vertical plane parallel to the rotational axis of the track sprocket.

Referring now to the drawings and, in particular, to FIG. 1, there is shown a track-type tractor or machine 10. The illustrated tractor 10 can represent the type of crawler design manufactured by Caterpillar, Inc., and referred to, for example, as Model 963. The machine 10 is of known construction and has a prime mover, typically a diesel engine, and a drive train which includes a pair of final drives 11 represented by a spindle housing 12 and a hub assembly 13 on each side of the machine. The hub assembly 13 (sometimes simply called a hub) rotates about an axis 14. The non-rotating spindle housing 12 (sometimes simply called a spindle) is a hollow circular body that is fixed by bolts 16 on a gear case 17 which in turn is bolted to the machine frame, designated 15 (FIG. 1). The bolts 16 are generally evenly spaced in a circular pattern concentric with the axis 14 and extend through a flange 18 of the spindle 12.

The hub assembly 13 carries a sprocket 20 that is in the form of arcuate segments 19. The sprocket segments 19 are fixed to a circular peripheral flange 21 of the hub assembly 13 by a plurality of bolts 22. A carrier 27 is fixed to the flange 21 by bolts 28 received in holes distributed about its circumference. As the illustrated tractor 10, a Caterpillar, Inc. Model 963, is originally manufactured, bearings 31 supporting the hub 13 on the spindle 12 as well as a gear train within the carrier 27 are protected from the ingress of debris through a gap 32 between these elements by a seal assembly 33. The gap 32 allows for relative rotation of the hub 13 and the spindle 12 without mutual wear at this point. The seal assembly 33 is a "duo-cone" construction commonly used by Caterpillar, Inc. for this kind of service.

Where the tractor 10 operates in hostile environments, especially in a landfill, the undercarriage can pick up debris and pack it against the exposed surfaces. This presence of debris is especially abrasive to rotating parts such as the hub 13 and to parts adjacent the rotating parts such as the spindle 12. Debris will rub on the rotating parts and if caked onto or entrained by the rotating or moving parts will be rubbed over the stationary parts. Moreover, strands of debris such as wire, rope, cable, and the like can be picked up by the rotating parts such as the sprocket 20 and hub 13 and be wrapped around the spindle 12. This wrap-up of strand-like material can be the source of high friction forces leading to excessive abrasion of the surrounding surfaces, in particular the spindle 12. Still further, it is not uncommon for wire-like material picked-up by the track, designated 25, or the sprocket 20 to be tightly wound around the part of the spindle 12 forming the stationary side of the gap 32. Wire or strand-like material in the area of the gap 32 can be prone to be pulled through the gap, possibly assisted by the packing of other debris. Eventually, a wire or strand can navigate through the gap 32 and reach the seal assembly 33. In this case, the seal will be destroyed and if such destruction is not immediately detected, lubrication oil in the carrier 27 will be lost and the gear train and bearings in this area will be likewise destroyed. This destruction results in expensive repairs and machine down-time.

Figure 3:
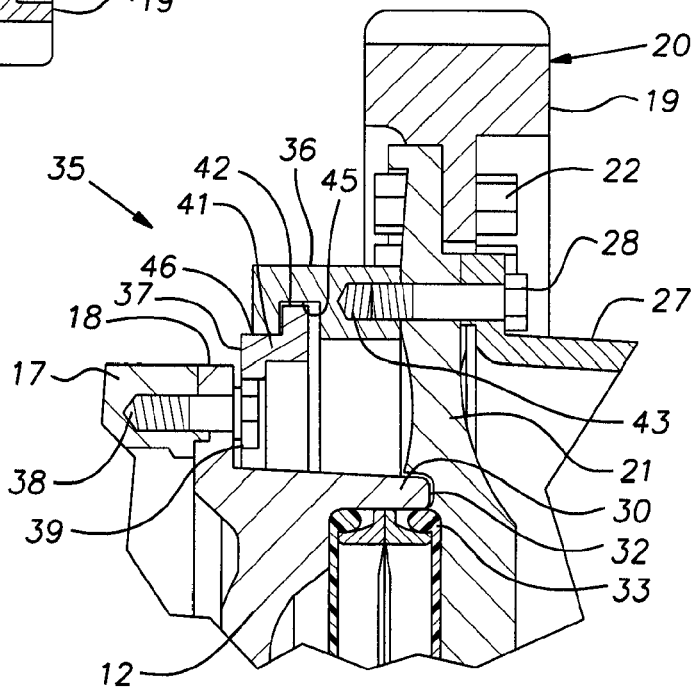
FIG. 3 is an enlarged fragmentary cross-sectional view of a portion of the guard and final drive.
Figure 4:
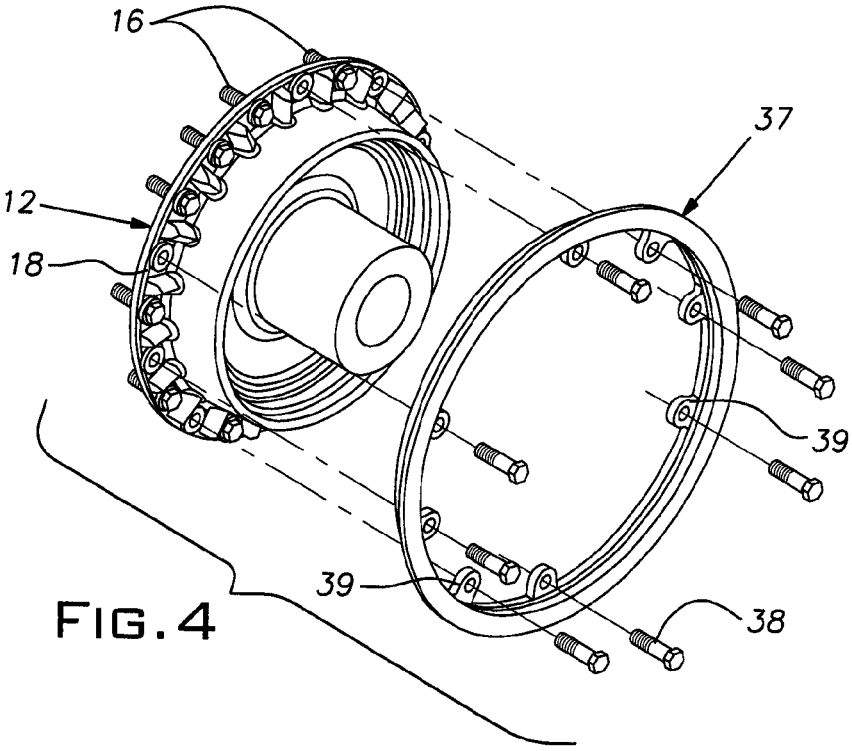
FIG. 4 is an exploded view of a final drive spindle housing and a non-rotating part of the guard of the invention.
Figure 5:
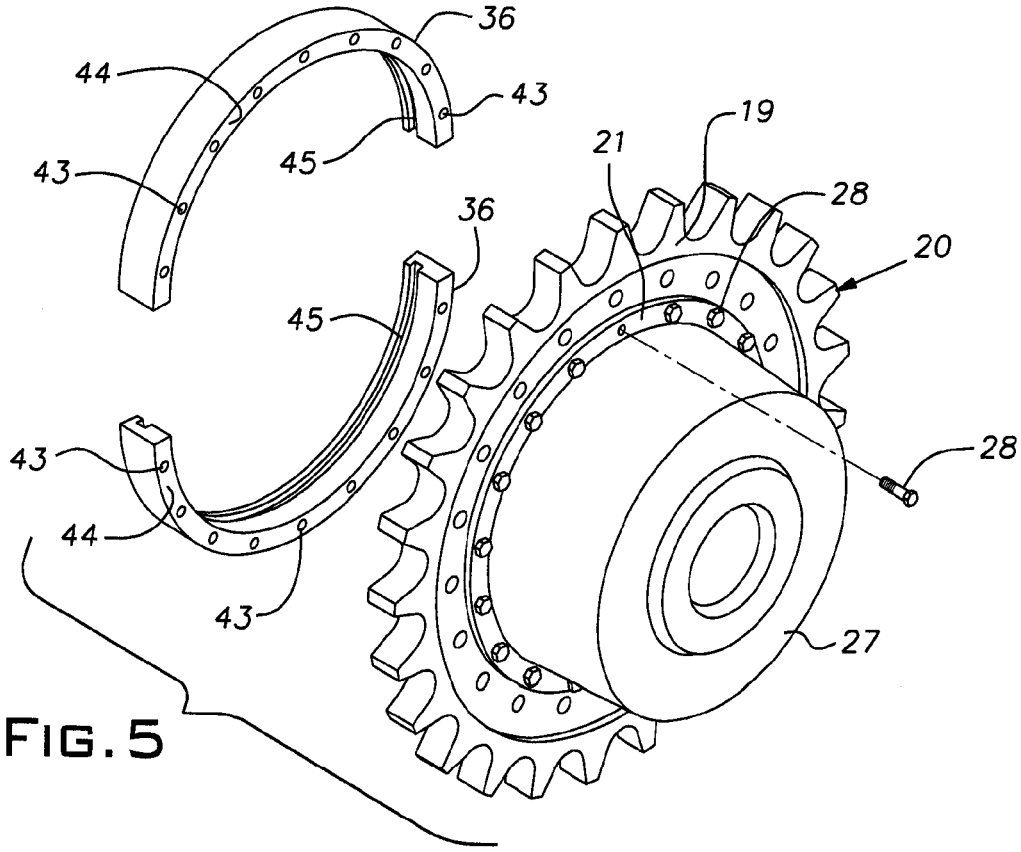
FIG. 5 is an exploded view of a final drive hub and a rotating shell part of the guard of the invention.

The invention reduces the risk of debris reaching the gap 32 by shielding the circumferential area surrounding the gap. This shield or guard assembly 35 is formed by interfitting annular guard parts in the form of a cylindrical shell 36 (FIG. 5) and a circular ring 37 (FIG. 4). In the illustrated case, the circular ring part 37 of the guard assembly 35 can be a continuous annulus of a single piece of steel and is installed on the spindle 12 by first disassembling the hub 13 from the spindle. The guard ring 37 is mounted on the spindle 12 with a series of circumferentially spaced bolts 38 assembled through holes in circumferentially spaced mounting tabs 39. The guard ring 37 is proportioned to align the holes in the tabs 39 with factory holes in the spindle flange 18 used to mount the spindle 12 to the gear case 17. More specifically, a limited number of bolts, less than the full set of bolts designed to hold the spindle 12 on the gear case 17, are first removed to allow the tabs to be positioned against the spindle flange 18. The bolts 38 holding the guard ring 37 on the spindle flange 18 can be somewhat longer than the original factory bolts so as to accommodate the axial thickness of the tabs 39. As shown most clearly in FIG. 3, the cross-section of the guard ring 37 is stepped such that it includes a short cylindrical axially extending portion 41 and an outwardly extending radial flange portion 42.

Once the guard ring 37 is installed on the spindle 12, the hub 26 and carrier 27 can be reinstalled on the spindle and, thereafter, the cylindrical guard shell 36, manufactured in two semi-circular parts is installed over the guard ring 37. This is accomplished by moving the parts of the ring 37 radially between the sprocket 20 and the plane of the spindle flange 18. The guard shell 36 has a plurality of blind internally threaded holes 43 in a radial face 44 adapted to abut the inboard side of the hub 13 and located in line with the original hole centers in the hub that received the factory bolts that secured the carrier 27 to the hub 13. When the sections of the guard shell 36 are properly positioned, the bolts 28 can be assembled through the respective holes in the carrier 27 and hub 13, and tightened into the holes 43. The guard shell 36 has an internal circumferential groove 45 that, when the guard shell is properly positioned, fits over the radial flange portion 42 of the guard ring 37. The radial wall thickness of the guard shell 36 is sufficient to provide enough stock for the threaded holes 43 to be tapped therein and to leave adequate strength for anchoring the bolts 28.

The guard assembly 35 affords a high degree of protection for the seal assembly 33 as well as the parts of the spindle 12 surrounding the seal. With reference to FIG. 3, the circular ring 37 is proportioned relative to the interior of the guard shell 36 to form a gap 46 that is relatively small, ideally not being much more than a running fit between opposing cylindrical surface areas of these components. Inspection of FIG. 3 shows that in order for debris to pass through the gap 46, it must change directions at least three times in movement from the exterior of the guard 35 to the interior. This tortuous labyrinth-like path creates a high resistance to the entrance of foreign material into the interior of the guard assembly 35. Any debris entering the gap 46 would have to change directions three times to enter the hollow space and encircled by the guard shell 36 and migrate towards the gap 32 shielding the seal assembly 33.

It will be seen that the guard assembly 35 of the invention provides, as a first observation, a redundant mechanical shield; the gap 32 formed between the hub 13 and annular lip 30 of the spindle 12 forming one mechanical shield and the inter-fitting elements of the guard shell 36 and ring 37 providing the gap 46 forming a second mechanical shield. A second factor in the effectiveness of the guard assembly 35 is the axial offset of the gap 46 from the gap 32 associated with the seal assembly 33. Wire, strands and like debris can be especially destructive to the seal assembly 33 where it finds its way to the area of the gap 32. The danger of this happening is much higher where the spindle area associated with the annular lip 30 is directly exposed to the environment. Such exposure is eliminated by the guard assembly 35. Still further, the guard assembly 35 has the feature that, because its gap 46 is axially displaced from the spindle and hub gap 32 wire, were it ever to migrate or be forced through the guard gap 46 cannot be directly wound about the spindle 12, in the fashion of a capstan, in the area of the gap 32 since any tension in such a wire or strand would bias the wire to be wound about the spindle in a radial plane encompassing the guard shell internal groove 45. As shown, such a plane is axially displaced from the area of the gap 32.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A guard for a crawler type land vehicles having a frame, a final drive on each side of the frame, the final drive including a spindle housing with a flange bolted to the frame and a sprocket hub rotationally supported on the spindle housing, a track sprocket on the sprocket hub, the spindle housing and hub establishing a small gap to form a mechanical shield to protect a rotational seal within the space enclosed by the spindle housing and sprocket hub, the guard being adapted to be assembled radially outward of the mechanical shield, the guard having a circular shell member for bolting to an inside face of the sprocket hub and extending axially in one piece across substantially all of the distance between the spindle flange and the sprocket hub, the guard shell having an internal circumferential groove, a circular radial flange for mounting on the spindle flange in the space between the spindle flange and the sprocket hub, the guard shell being diametrally split whereby it can be radially assembled around the spindle flange with the radial flange closely fitting within the groove to form a stepped gap for excluding debris including strand material from a zone within the guard shell.

2. A guard as set forth in claim 1, wherein the shell member can be bolted to the sprocket hub with bolts serving to mount a carrier on an outboard side of the sprocket hub.

3. A guard as set forth in claim 2, wherein said shell member is provided with internally threaded receiving holes for said mounting bolts.

4. A guard as set forth in claim 3, wherein the shell member has a wall thickness greater than the bolt diameter and said wall provides said receiving holes.

*5. A guard as defined in claim 1, wherein said groove is generally U-shaped in cross-section whereby said radial flange is surrounded by said guard shell for sealing in two opposed radial directions.*

*6. A guard for crawler type land vehicles having a frame, a final drive on each side of the frame, the final drive including a spindle housing with a flange bolted to the frame and a sprocket hub rotationally supported on the spindle housing, a track sprocket on the sprocket hub, the spindle housing and sprocket hub establishing a small gap to form a mechanical shield to protect a rotational seal within the space enclosed by the spindle housing and sprocket hub, the guard being adapted to be assembled radially outward of the mechanical shield, the guard having a circular shell for bolting on an inner side of the sprocket hub with bolts in a circle shared by bolts mounting a carrier on an outer side of the sprocket hub and extending axially in one piece between the spindle flange and the sprocket hub, the guard shell having an internal circumferential groove, the guard having a circular radial flange on the spindle housing in the space between the spindle flange and the sprocket hub, the guard shell adjacent an end distal from the sprocket hub being smaller in diameter than a diameter of the circular radial flange and being diametrally split whereby it can be radially assembled around the circular radial flange with the circular radial flange closely fitting within the groove to form a stepped gap for excluding debris including strand material from a zone within the circular guard shell.*

*7. A guard as set forth in claim 6, wherein the guard shell can be bolted to the sprocket hub with bolts serving to mount the carrier on the outer side of the sprocket hub.*

*8. A guard for crawler type land vehicles having a frame, a final drive on each side of the frame, the final drive including a spindle housing with a flange bolted to the frame and a sprocket hub rotationally supported on the spindle housing, a track sprocket on the sprocket hub, the spindle housing and sprocket hub establishing a small gap to form a mechanical shield to protect a rotational seal within the space enclosed by the spindle housing and sprocket hub, the guard being adapted to be assembled radially outward of the mechanical shield, the guard having a circular shell member for bolting on an inner side of the sprocket hub and extending axially in one piece between the spindle flange and the sprocket hub, whereby said circular shell member of said guard rotates with said sprocket hub and is exposed to the external debris environment, said circular shell member of the guard having an inwardly facing rotating first stepped gap forming structure, an outwardly facing second stepped gap forming structure fixed on said spindle housing and free of any radial interference with said first stepped gap forming structure so said first stepped gap forming structure can be moved freely in a radially outward direction with respect to said second stepped gap forming structure, a portion of said circular shell member on a side of said second stepped gap forming structure distal from said sprocket hub being smaller in diameter than a maximum diameter of said second stepped gap forming structure, said first and second stepped gap forming structures co-acting to create an annular stepped gap for excluding debris as said circular shell member rotates around said spindle housing, said annular debris excluding gap being exposed to the external debris environment and being displaced from said small gap, said guard circular shell member being diametrally split into two semi-circular sections whereby the circular shell member can be radially disassembled from around said second stepped gap structure without disturbing said second stepped gap forming structure.*

*9. A guard as defined in claim 8, wherein said annular debris excluding stepped gap is displaced radially from said small gap.*

*10. A guard as defined in claim 9, wherein said rotating first stepped gap forming structure is a groove on said circular shell member which is annular when said shell is assembled over said second stepped gap forming structure and said second stepped gap forming structure includes a radially outwardly extending circular flange fixed on said spindle housing, which circular flange extends into said annular groove when said shell is assembled over said second stepped gap forming structure.*

*11. A guard as defined in claim 10, wherein said groove is U-shaped to form two generally parallel, radially extending portions of said debris excluding gap when said circular shell member is assembled over said second stepped gap forming structure.*

*12. A guard as defined in claim 9, wherein said groove is U-shaped to form two generally parallel, radially extending portions of said debris excluding gap when said circular shell member is assembled over said second stepped gap forming structure.*

*13. A guard as defined in claim 8, wherein said groove is U-shaped to form two generally parallel, radially extending portions of said debris excluding gap when said circular shell member is assembled over said second stepped gap forming structure.*

*14. A guard for crawler type land vehicles having a frame, a final drive on each side of the frame, the final drive including a spindle housing with a flange bolted to the frame and a sprocket hub rotationally supported on the spindle housing, a track sprocket on the sprocket hub, the spindle housing and sprocket hub establishing a small gap to form a mechanical shield to protect a rotational seal within the space enclosed by the spindle housing and sprocket hub, the guard being adapted to be assembled radially outward of the mechanical shield, the guard having a circular shell member for bolting to the sprocket hub with bolts in a circle shared by bolts mounting a carrier on an outer side of the sprocket hub and extending axially in one piece between the spindle flange and the sprocket hub, the guard shell member having an internal circumferential groove, the guard having a circular radial flange fixed on the spindle housing in the space between the spindle flange and the sprocket hub, the guard shell adjacent an end distal from the sprocket hub being smaller in diameter than a diameter of the circular radial flange and being diametrally split whereby it can be radially assembled around the circular radial flange with the circular radial flange closely fitting within the groove to form a stepped gap for excluding debris including strand material from a zone within the guard shell member.*

*15. A guard for crawler type land vehicles having a frame, a final drive on each side of the frame, the final drive including a spindle housing bolted to the frame and a sprocket hub*

*with an outer periphery rotationally supported on the spindle housing, a track sprocket on the sprocket hub, the spindle housing and sprocket hub establishing a small gap to form a mechanical shield to protect a rotational seal within the space enclosed by the spindle housing and sprocket hub, the guard being adapted to be assembled radially outward of the mechanical shield, the guard having a circular shell member for bolting to the sprocket hub and extending axially in one piece between the frame and the sprocket hub, the guard shell member having a main outer annular surface radially closer to said outer periphery of the sprocket hub than to the seal, the guard shell member having a wall element adjacent an end distal from the sprocket hub extending radially inward to an inner diameter thereof, a circular radially outwardly extending ring element in the guard shell member fixed on the spindle housing, the radially outwardly extending ring element having an outer diameter larger than the inner diameter of the radially inwardly extending wall element, the guard shell member being diametrally split whereby it can be assembled between the spindle housing and sprocket hub while the sprocket hub remains assembled with the spindle housing and without disturbing said ring element, the wall element and ring element forming a stepped gap to mutually exclude debris including strand material by avoiding a straight axial line path from outside the guard to an interior of the guard shell member.*

*16. A guard as defined in claim 15, wherein said stepped gap is generally U-shaped.*

*17. A guard for crawler type land vehicles having a frame, a final drive on each side of the frame, the final drive including a spindle housing bolted to the frame and a sprocket hub rotationally supported on the spindle housing, a track sprocket on the sprocket hub, the spindle housing and sprocket hub establishing a small gap to form a mechanical shield to protect a rotational seal within the space enclosed by the spindle housing and sprocket hub, the guard being adapted to be assembled radially outward of the mechanical shield, the guard having a circular shell member for bolting to the sprocket hub and extending axially in one piece between the frame and the sprocket hub, the guard shell member having a wall element extending radially inward to an inner diameter thereof, a circular radially outwardly extending ring element in the shell member fixed on the spindle housing axially between the guard shell member wall element and the sprocket hub, the radially outwardly extending ring element having an outer diameter larger than the inner diameter of the radially inwardly extending wall element, the guard shell member being diametrally split whereby it can be assembled between the frame and sprocket hub while the sprocket hub remains assembled with the spindle housing, the wall element and ring element forming a stepped gap to mutually exclude debris including strand material by avoiding a straight axial line path from outside the guard to an interior of the guard shell member, the stepped gap being remote from the sprocket hub and axially fully offset from the small gap.*

*18. A guard as defined in claim 17, wherein said stepped gap is generally U-shaped.*

*19. A guard as defined in claim 17, wherein said offset of said stepped gap from said small gap is in the axial direction of said spindle.*

*20. In combination, a crawler type land vehicle having a frame, a final drive on each side of the frame, the final drive including a spindle housing bolted to the frame, a sprocket hub rotationally supported on the spindle housing, and a carrier on an outboard side of the sprocket hub, a track sprocket on the sprocket hub, the spindle housing and sprocket hub establishing a small gap to form a mechanical shield to protect a rotational seal within the space enclosed by the spindle housing and sprocket hub, a guard assembled radially outward of the mechanical shield, the guard having a circular shell member on an inner side of the sprocket hub and extending axially between the frame and the sprocket hub, whereby said circular shell member rotates with said sprocket hub and is exposed to the external debris environment, said circular shell member having an inwardly facing rotating first stepped gap forming structure, an outwardly facing second stepped gap forming structure fixed on said spindle housing, said first and second stepped gap forming structures coacting to create an annular stepped gap for excluding debris as said circular shell member rotates around said spindle housing, said debris excluding gap being exposed to the external debris environment and being displaced from said small gap, said circular shell member being diametrally split into two semi-circular sections whereby the circular shell member can be radially disassembled from around said outwardly facing second stepped gap structure without disturbing said second stepped gap forming structure, the circular shell member, sprocket hub and carrier having alignable holes in a circular pattern, one of the circular shell member, sprocket hub, and carrier being internally threaded at a respective alignable hole set common among the circular shell member, sprocket hub and carrier and two of the circular shell member, sprocket hub and carrier being free of internal threads at their respective holes of the hole set, the circular shell member and carrier being retained on said sprocket hub by threaded bolts assembled in said alignable holes.*

*21. In combination, a crawler type land vehicle having a frame, a final drive on each side of the frame, the final drive including a spindle housing bolted to the frame, a sprocket hub rotationally supported on the spindle housing, and a carrier on an outboard side of the sprocket hub, a track sprocket on the sprocket hub, the spindle housing and sprocket hub establishing a small gap to form a mechanical shield to protect a rotational seal within the space enclosed by the spindle housing and sprocket hub, a guard assembled radially outward of the mechanical shield, the guard having a circular shell member on an inner side of the sprocket hub and extending axially between the frame and the sprocket hub, whereby said circular shell member rotates with said sprocket hub and is exposed to the external debris environment, said circular shell member having an inwardly facing rotating first stepped gap forming structure, an outwardly facing second stepped gap forming structure fixed on said spindle housing, said first and second stepped gap forming structures coacting to create an annular stepped gap for excluding debris as said circular shell member rotates around said spindle housing, said debris excluding gap being exposed to the external debris environment and being displaced from said small gap, said circular shell member being diametrally split into two semi-circular sections whereby the circular shell member can be radially disassembled from around said outwardly facing second stepped gap structure without disturbing said second stepped gap forming structure, the circular shell member being retained on the inner side of the sprocket hub with threaded bolts in receiving holes in the sprocket hub adjacent an outer circumference of the carrier.*

* * * * *